// Patented May 20, 1941

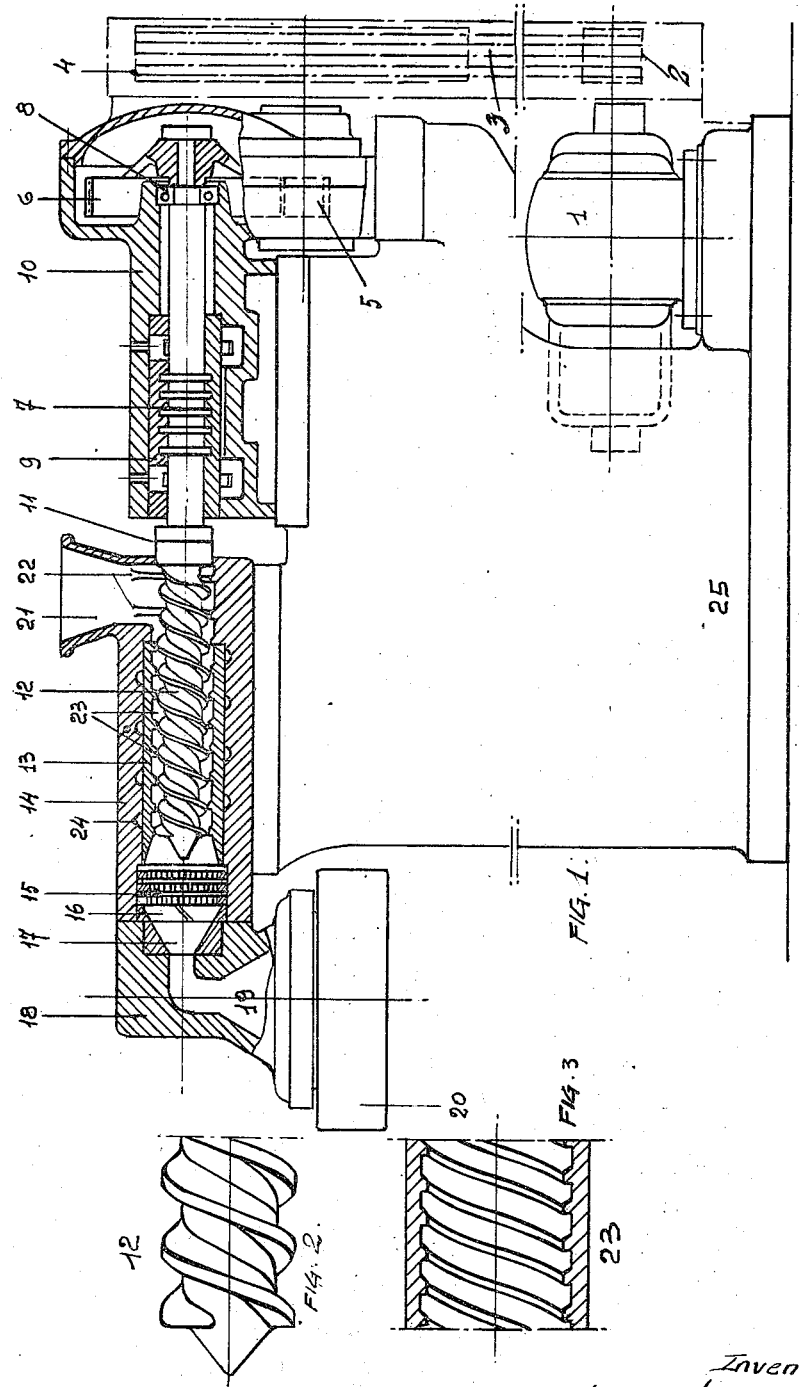

2,242,364

UNITED STATES PATENT OFFICE 2,242,364

MACHINE FOR MANUFACTURING MACARONI AUTOMATICALLY

Cesare Montanari, Milan, Italy

Application June 3, 1939, Serial No. 277,282
In Italy June 18, 1938

1 Claim. (Cl. 107—14)

The object of the present invention is to obtain, by means of a very simple machine, a perfect continuous and automatic kneading of a mixture of coarse and fine flour and water, fed in a continuous and automatic manner to said machine.

"Perfect kneading" means that the mixture of coarse and fine flour and water, is converted by said machine into an homogeneous paste, without deteriorating the properties of gluten, through excessive friction and consequent injurious heating of the paste.

The machine, in fact, achieves in a continuous manner the fundamental operation of usual kneading machines for macaroni, namely partial shifts of paste in the dough, with immediate mutual compenetration of the parts of the paste itself.

The accompanying drawing illustrates, simply by way of example, an embodiment of the machine according to the present invention.

The drawing shows in Fig. 1 a partial longitudinal section of the machine, Figs. 2 and 3 showing two details thereof.

Referring more particularly to the drawing, the improved machine is preferably driven by a motor 1 the drive shaft of which is fitted with a grooved pulley 2 over which is trained an endless transmission member 3 which also engages a grooved pulley 4, the shaft of which is rotatable in the machine frame.

A pinion 5 is fixed to the shaft of the driven pulley 4 and meshes with gear-wheel 6 keyed on shaft 7. Shaft 7 is supported at 9 with ball bearings 8. To the other end of shaft 7 is clutched-in the Archimedes screw 12 by means of a toothed clutch 11. The screw 12 revolves within cylinder 14 provided with a liner 13 and with a feeding hopper 21. In liner 13, are cut helical grooves 23, inclined in the opposite direction to the direction of said screw 12, as shown in detail in Figs. 2 and 3. Said grooves extend also within the hopper and have their beginning at 22.

Inside cylinder 14 are also placed perforated plates 15. The end of the cylinder 14 opens in a discharging head 16 provided with cavities 17 and 19. The mouth of cavity 19 opens on the proper die, of conventional design, which die is supported by ring 20.

The operation of the machine is as follows:
The mixture of coarse flour, fine flour and water fed from hopper 21 is prepared in a usual mixer with intermittent or continuous production; the mixture is caught by the Archimedean screw and thoroughly kneaded into an homogeneous paste, and during said operation, is pushed forward, with a gradually increasing pressure, towards the group of perforated plates 15.

The mixture is seized by said screw this action being facilitated by the ribs 22 of the grooves in cylinder 13, and the progress of the paste during the kneading operation, is obtained through the rotation of the screw 12. The perforated dies 15 form a resistance to the passage of the paste, so as to cause an increasing pressure up to its most convenient working value.

The machine is so designed as to be easily cleaned inside; with this object in view the screw is mounted so as to be easily slipped out of its cylinder. Both the screw 12 and the liner 13 are made of rustless material.

Of course, the shape and the details of design may vary without thereby exceeding the limits of the present invention.

Having now particularly described and ascertained the nature of my said invention and in what manner the same is to be performed, I declare that what I claim is:

A continuous machine for the automatic production of macaroni including an elongated cylindrical casing, an upright inlet hopper at one end thereof, a discharge head at the other end of the casing, a die supporting ring at the outer end of the discharge head, an elongated screw of uniform cross section rotatably mounted in the bottom of the feed hopper and the major portion of the casing and terminating short of the other end of the casing, the interior of the casing housing the screw and the bottom of the feed hopper having uniform spiral grooves of a pitch opposite to that of the screw, and perforated plates arranged transversely of the casing near the discharge head.

CESARE MONTANARI